United States Patent [19]

Tanitsu et al.

[11] Patent Number: 5,520,952
[45] Date of Patent: May 28, 1996

[54] METHOD FOR FORMING A PROTECTIVE COATING FILM ON ELECTRONIC PARTS AND DEVICES

[75] Inventors: Katsuya Tanitsu, Kanagawa-ken; Atsushi Kawakami, Tokyo-to; Hatsuyuki Tanaka; Toshimasa Nakayama, both of Kanagawa-ken, all of Japan

[73] Assignee: Tokyo Ohka Kogyo Co., Ltd., Japan

[21] Appl. No.: 274,021

[22] Filed: Jul. 12, 1994

[30] Foreign Application Priority Data

Jul. 16, 1993 [JP] Japan .................................. 5-177040
Oct. 1, 1993 [JP] Japan .................................. 5-247163

[51] Int. Cl.$^6$ ....................................................... B05D 3/02
[52] U.S. Cl. ........................... 427/58; 427/379; 427/387; 428/1
[58] Field of Search ........................... 427/387, 58, 379; 428/1

[56] References Cited

U.S. PATENT DOCUMENTS

| | | | |
|---|---|---|---|
| 4,211,823 | 7/1980 | Suzuki et al. | 428/412 |
| 4,250,240 | 2/1981 | Shimada et al. | 430/66 |
| 4,343,857 | 8/1982 | Uram, Jr. | 428/336 |
| 4,405,679 | 9/1983 | Fujioka et al. | 428/216 |

FOREIGN PATENT DOCUMENTS

| | | |
|---|---|---|
| 54-67000 | 5/1979 | Japan . |
| 54-144500 | 11/1979 | Japan . |
| 57-133129 | 8/1982 | Japan . |
| 58-69262 | 4/1983 | Japan . |
| 62-163016 | 7/1987 | Japan . |
| 62-242918 | 10/1987 | Japan . |
| 63-131103 | 6/1988 | Japan . |
| 1-101339 | 4/1989 | Japan . |
| 1-212287 | 8/1989 | Japan . |
| 2-57335 | 2/1990 | Japan . |
| 3-287627 | 12/1991 | Japan . |
| 4-337373 | 11/1992 | Japan . |

OTHER PUBLICATIONS

SPIE Proceeding, vol. 1727, pp. 299–305, May, 1992.
Hugot–Le Goff et al. Optical Materials Technology For Energy Efficiency And Solar Energy Conversion XI: Photostable Fluorescent Glass Films For Solar Concentrators.

*Primary Examiner*—Shrive Beck
*Assistant Examiner*—Erma Cameron
*Attorney, Agent, or Firm*—Wenderoth, Lind & Ponack

[57] ABSTRACT

Proposed is a novel method for the formation of a protective coating film having a pencil hardness of up to 9 H on the surface of various substrates or, in particular, electronic parts such as color filters and liquid crystal display panels. The method comprises: coating the surface with a liquid coating composition of which the principal ingredient is a partial cohydrolysis-condensation product of a tetraalkoxy silane, e.g., tetraethoxy silane, and a functional alkoxy silane, e.g., 3-methacryloxypropyl trimethoxy silane, and drying and heating the coating layer to effect complete curing. The hardness of the cured protective film can be increased by admixing the liquid coating composition with a finely divided inorganic filler such as a colloidal silica. It is optional that the functional alkoxy silane is subjected to the cohydrolysis reaction after it is polymerized alone or after it is copolymerized with a polyfunctional acrylic monomer.

7 Claims, No Drawings

METHOD FOR FORMING A PROTECTIVE COATING FILM ON ELECTRONIC PARTS AND DEVICES

BACKGROUND OF THE INVENTION

The present invention relates to a method for the formation of a protective coating film on the surface of a substrate material. More particularly, the invention relates to a method for the formation of a uniform protective coating film having a very high hardness on the surface of various kinds of substrates such as electronic parts and devices.

As is well known, the surface of various kinds of electric and electronic parts such as liquid-crystal display panels and the like is required to be protected against scratches and other mechanical damages by forming a protective coating film thereon having high hardness.

Liquid-crystal display panels usually have a structure consisting of two substrate plates made from a transparent material such as glass, acrylic resins, polyethylene terephthalate resins and the like held in parallel with a narrow gap space therebetween, which is filled with a liquid crystal substance, the peripheries of the parallel plates being air-tightly sealed with a glass frit or an organic sealant. Each of the two parallel plates is provided on the inwardly facing surface with a pattern of electrodes while an orientation membrane is formed on the areas in contact with the liquid crystal substance which serves to align the liquid crystal molecules in a definite direction when an electric voltage is applied to the electrodes. Such an orientation membrane is prepared by forming a coating layer of an organic synthetic resin on the surface of each of the substrate plates having the electrodes followed by rubbing the surface in a definite direction with a cotton cloth and the like, i.e. a so-called rubbing treatment.

In the above described manufacturing procedure of liquid crystal display panels, however, a trouble is sometimes unavoidable that cracks are formed in the electrodes under the influences of mechanical forces. This is presumably a consequence of the difference in the thermal expansion coefficients which is not negligible between the orientation membrane made from an organic material and the electrodes made from an inorganic material of high hardness such as ITO and the like.

With an object to solve the above mentioned problems, a method is proposed according to which a protective coating film mainly consisting of silicon dioxide is interposed between the electrodes and the orientation membrane. Such a silicon dioxide-based intermediate film can be prepared by coating the substrate surface with a liquid coating composition containing a silanol compound followed by baking of the coating layer while such a baking treatment causes another problem that degradation is caused in the electrodes to increase the electric resistivity thereof because the baking temperature must be as high as 400° C. or even higher.

In recent years, moreover, so-called plastic liquid crystal display panels have been developed, of which the substrates are made from a synthetic resin such as acrylic resins, poly(ethylene terephthalate) resins and the like. It is important in such a plastic liquid crystal display panel that the electrodes are provided with a protective film having a high hardness and capable of being formed by baking at a relatively low baking temperature because the plastic substrates are thermally not stable enough at an elevated temperature.

Another important objective in the electronic industry, of which a high-hardness protective film is desired to be formed on the surface, is a color filter which is a transparency colored pattern-wise mainly in three primary colors of red, blue and green and used by mounting on the substrate plate of a color display device such as a liquid crystal color display panel. In the preparation of such a color display device, the preparation of the color filter is followed, usually, by the formation of a transparent electroconductive film and an orientation membrane.

Troubles are sometimes unavoidable in this procedure that creases and cracks are formed in the colored coating film of the color filter or fissures are formed in the electroconductive film. These troubles are caused as a consequence of the larger than negligible difference in the thermal expansion coefficients between the colored coating film, which is made from an organic material such as dyes, organic pigments, synthetic resins and the like, and the transparent electroconductive film made from an inorganic material of high hardness such as ITO and the like.

Various proposals have been made heretofore to solve the above mentioned problems, for example, by providing a protective film on the colored coating film of the color filter. Examples of such a protective film include those formed by coating the surface with a solution prepared by dissolving a solvent-soluble polyamide resin or a polyimide resin in a lactone compound, a phenol compound or a mixture thereof as the solvent followed by drying as disclosed in Japanese Patent Kokai 62-163016, those consisting mainly of silicon dioxide as disclosed in Japanese Patent Kokai 62-242918 and those consisting of an overcoating layer of a thermosetting resin which can retain transparency by curing, of which the temperature for the exothermic peak in the crosslinking and curing reaction is 200° C. or higher as is disclosed in Japanese Patent Kokai 63-131103. These protective films heretofore proposed, however, are not quite satisfactory in respects of the heat resistance, light fastness, hardness, adhesion and stability against sputtering so that it is eagerly desired to develop a method for forming a protective film on a color filter, of which high precision is essential, without problems due to the above mentioned deficiencies in the prior art methods using conventional coating agents.

SUMMARY OF THE INVENTION

The present invention accordingly has an object to provide a novel and improved method for the formation of a protective coating film on the surface of various kinds of electronic parts and devices including liquid crystal display panels and color filters, which method is free from the above described problems and disadvantages in the prior art methods and can be performed in a remarkably simple and convenient procedure including a relatively low baking temperature.

Thus, the method of the present invention for the formation of a protective coating film on the surface of a substrate comprises the steps of:

(a) coating the surface with a liquid coating composition containing, as the principal ingredient, a partial cohydrolysis-condensation product of a first silane compound represented by the general formula $$Si(OR)_4, \qquad (I)$$

in which R is an alkyl group having 1 to 4 carbon atoms or a phenyl group, and a second silane compound represented by the general formula $$R^1{}_n Si(OR)_{4-n},\quad (II)$$

in which R has the same meaning as defined above, $R^1$ is a functional group which is a polymerizable group selected from the class consisting of vinyl group, 3-acryloxypropyl group and 3-methacryloxypropyl group or a 3-glycidyloxypropyl group and the subscript n is 1, 2 or 3, to form a coating layer on the surface; and (b) drying and heating the coating layer at a temperature in the range from 140° to 300° C. for 15 to 120 minutes to effect curing of the dried coating layer.

Though optional, the liquid coating composition used in step (a) of the inventive method is admixed with an inorganic filler having an average particle diameter in the range from 5 to 200 nm in order to enhance the mechanical strengths of the protective coating film formed by the inventive method.

DETAILED DESCRIPTION OF THE PREFERRED EMBODIMENTS

As is described above, the inventive method comprises the steps of coating the surface of the substrate with a specific liquid coating composition, of which the principal ingredient is a partial cohydrolysis-condensation product of two different kinds of silane compounds to form a coating layer and drying and heating the thus formed coating layer under specified heating conditions to effect curing of the coating layer.

The first silane compound to be subjected to the partial cohydrolysis-condensation reaction with the second silane compound is represented by the above given general formula (I), in which the group denoted by R is an alkyl group having 1 to 4 carbon atoms or a phenyl group. Particular examples of the first silane compound include tetramethoxy silane, tetraethoxy silane, tetrapropoxy silane, tetrabutoxy silane and tetraphenoxy silane, of which tetramethoxy silane and tetraethoxy silane are preferred.

On the other hand, the second silane compound to be subjected to the partial cohydrolysis-condensation reaction with the above mentioned first silane compound is represented by the general formula (II), in which the subscript n is 1, 2 or 3, R has the same meaning as defined for the first silane compound and $R^1$ is a functional group which is a polymerizable group selected from the class consisting of a vinyl group, 3-acryloxypropyl group and 3-methacryloxypropyl group or a 3-glycidyloxypropyl group.

Particular examples of the second silane compound in conformity with the definition of the general formula (II) include:

3-acryloxypropyl trimethoxy silane, 3-methacryloxypropyl trimethoxy silane, 3-glycidyloxypropyl trimethoxy silane, vinyl trimethoxy silane, di(3-acryloxypropyl) dimethoxy silane, di(3-methacryloxypropyl) dimethoxy silane, di(3-glycidyloxypropyl) dimethoxy silane, divinyl dimethoxy silane, tri(3-acryloxypropyl) methoxy silane, tri(3-methacryloxypropyl) methoxy silane, tri(3-glycidyloxypropyl) methoxy silane, trivinyl methoxy silane, 3-acryloxypropyl triethoxy silane, 3-methacryloxypropyl triethoxy silane, 3-glycidyloxypropyl triethoxy silane, vinyl triethoxy silane, di(3-acryloxypropyl) diethoxy silane, di(3-methacryloxypropyl) diethoxy silane, di(3-glycidyloxypropyl) diethoxy silane, divinyl diethoxy silane, tri(3-acryloxypropyl) ethoxy silane, tri(3-methacryloxypropyl) ethoxy silane, tri(3-glycidyloxypropyl) ethoxy silane, trivinyl ethoxy silane, 3-acryloxypropyl tripropoxy silane, 3-methacryloxypropyl tripropoxy silane, 3-glycidyloxypropyl tripropoxy silane, vinyl tripropoxy silane, di(3-acryloxypropyl) dipropoxy silane, di(3-methacryloxypropyl) dipropoxy silane, di(3-glycidyloxypropyl) dipropoxy silane, divinyl dipropoxy silane, tri(3-acryloxypropyl) propoxy silane, tri(3-methacryloxypropyl) propoxy silane, tri(3-glycidyloxypropyl) propoxy silane, trivinyl propoxy silane, 3-acryloxypropyl tributoxy silane, 3-methacryloxypropyl tributoxy silane, 3-glycidyloxypropyl tributoxy silane, vinyl tributoxy silane, di(3-acryloxypropyl) dibutoxy silane, di(3-methacryloxypropyl) dibutoxy silane, di(3-glycidyloxypropyl) dibutoxy silane, divinyl dibutoxy silane, tri(3-acryloxypropyl) butoxy silane, tri(3-methacryloxypropyl) butoxy silane, tri(3-glycidyloxypropyl) butoxy silane, trivinyl butoxy silane and the like.

The liquid coating composition used in the method of the invention can be prepared by adding the above described first and second silane compounds in a suitable proportion into an organic solvent to form a solution which is then admixed with an appropriate amount of water and a small amount of an acid such as hydrochloric acid as a catalyst for promoting the reactions of hydrolysis and condensation of the silane compounds to obtain a partial cohydrolysis-condensation product of the silane compounds. It is further optional that the first and the second silanes are partially hydrolyzed separately beforehand and the thus obtained partial hydrolysis-condensation products are mixed together in an appropriate proportion, if they are compatible with each other, to give a liquid coating composition.

Examples of organic solvents suitable as a diluent of the silane compounds in the partial cohydrolysis-condensation reaction thereof include monohydric alcohols such as methyl, ethyl, propyl and butyl alcohols; polyhydric alcohols such as ethylene glycol, diethylene glycol, propylene glycol, dipropylene glycol, hexylene glycol and octylene glycol; ethers such as ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, ethylene glycol dimethyl ether, ethylene glycol diethyl ether, diethylene glycol monomethyl ether, diethylene glycol monoethyl ether, diethylene glycol dimethyl ether, diethylene glycol diethyl ether, propylene glycol dimethyl ether, propylene glycol diethyl ether, dipropylene glycol monomethyl ether, dipropylene glycol monoethyl ether, dipropylene glycol dimethyl ether and dipropylene glycol diethyl ether; fatty acids such as acetic acid and propionic acid; and esters such as methyl acetate, ethyl acetate, propyl acetate, isopropyl acetate, butyl acetate, isobutyl acetate, methyl propionate and ethyl propionate.

It is optional that the liquid coating composition used in the inventive method is admixed with a small amount of a polyfunctional acrylic monomer exemplified by pentaerythritol triacrylate, pentaerythritol trimethacrylate, pentaerythritol tetraacrylate, pentaerythritol tetramethacrylate, dipentaerythritol hexaacrylate, dipentaerythritol hexamethacrylate, dipentaerythritol pentaacrylate, hexa(2-methacryloxyethoxy) phosphazene, tris(2-acryloxyethyl) isocyanurate and tris(2-methacryloxyethyl) isocyanurate and the like.

When the viscosity of the liquid coating composition used in the inventive method as prepared in the above described manner is too high to be applied to the substrate surface by a conventional coating method, the liquid coating composition can be diluted by the addition of an organic solvent. Examples of such a diluent solvent include monohydric alcohols, polyhydric alcohols, ethers such as an ether of a polyhydric alcohol, carboxylic acids such as acetic and propionic acids, ketones such as acetone, methyl ethyl ketone, acetylacetone and methyl isobutyl ketone, and esters such as methyl acetate, ethyl acetate, butyl acetate and isoamyl acetate.

Besides the above described method for the preparation of the liquid coating composition used in the inventive method, in which the first and second silane compounds as such are mixed together and subjected to the partial cohydrolysis-condensation reaction, an alternative method for the preparation of the liquid coating composition is that the second silane compound having at least one functional group in a molecule is subjected, prior to mixing with the first silane compound, to a partial intermolecular reaction of the functional groups or, for example, the free-radical polymerization of the ethylenically unsaturated functional groups such as the vinyl, 3-acryloxypropyl and 3-methacryloxypropyl groups in an organic solvent under heating with admixture of a free-radical polymerization initiator such as tert-butyl hydroperoxide, cumene hydroperoxide, 2,2'-azobisisobutyronitrile, benzoyl peroxide, 2,2'-azobis(2,4-dimethylvaleronitrile) and the like. In conducting the above mentioned preliminary polymerization reaction of the second silane compound prior to the cohydrolysis reaction with the first silane compound, it is optional that the polymerization mixture is admixed with a polyfunctional acrylic monomer mentioned above so as to effect copolymerization of the second silane compound and the polyfunctional acrylic monomer.

In the above described procedure for the preparation of a liquid coating composition used in the inventive method, the second silane compound is used in an amount in the range from 0.05 to 9 moles or, preferably, from 0.1 to 5 moles per mole of the first silane compound and the amount of water added to the reaction mixture for the hydrolysis is in the range from 2 to 10 moles or, preferably, from 3 to 8 moles per mole of the total amount of the first and second silane compounds. The hydrolysis reaction is promoted by the addition of an acid as a catalyst, which is preferably an inorganic acid such as hydrochloric, nitric and phosphoric acids. The amount of the acid catalyst added to the reaction mixture is preferably in the range from 0.001 to 0.1% by weight based on the total amount of the first and second silane compounds. When a polyfunctional acrylic monomer is used in several different ways described above, the amount thereof is in the range from 0.5 to 300 parts by weight per 100 parts by weight of the second silane compound.

The liquid coating composition prepared from the first and second silane compounds and, optionally, a polyfunctional acrylic monomer in the above described manner can be admixed with a finely divided inorganic filler so that the protective coating film formed on a substrate surface by curing the composition is imparted with further increased mechanical strengths or, in particular, with an increased hardness and resistance against scratches. The average particle diameter of the finely divided inorganic filler should be in the range from 5 to 200 nm. Examples of suitable inorganic fillers include colloidal silica, fumed silica fillers, finely divided titanium dioxide fillers, colloidal alumina and the like. Various grades of commercial products are available on the market for these inorganic fillers and can be used as such. They can be used either singly or as a combination of two kinds or more according to need.

The amount of the finely divided inorganic filler, when added, in the liquid coating composition used in the inventive method is in the range from 0.3 to 500 parts by weight or, preferably, from 0.5 to 200 parts by weight per 100 parts by weight of the liquid coating composition before admixture of the inorganic filler. When the amount of the inorganic filler is too small, the desired effect of improvement in the hardness of the protective coating film cannot be obtained as a matter of course while, when the amount thereof is too large, the protective film formed from the coating composition would be somewhat brittle and the adhesion of the protective coating film to the substrate surface is decreased. If necessary, a dispersion aid can be added to the liquid coating composition prepared with admixture of an inorganic filler in order to ensure homogeneity and stability of dispersion.

In step (a) of the inventive method, the surface of a substrate, which is to be protected by forming a protective coating film thereon, is uniformly coated with the liquid coating composition prepared in the above described manner by using a suitable coating machine such as a spinner depending on the particular types of the substrate material. The coating amount is also dependent on the particular types of the substrate material but the thickness of the coating layer is usually in the range from 0.01 to 5 μm as dried.

In step (b) of the inventive method, the coating layer of the above prepared liquid coating composition is dried and heated at a temperature of 140° C. or higher or, preferably, in the range from 150° to 300° C. for a length of time in the range from 15 to 120 minutes in air to effect full curing of the coating layer.

In the following, the method of the present invention is described in more detail by way of examples.

EXAMPLE 1

A solution prepared by dissolving 152 g (1 mole) of tetramethoxy silane and 248 g (1 mole) of 3-methacryloxypropyl trimethoxy silane in 175 g of n-butyl alcohol was admixed with 126 g of deionized water and 0.02 g of concentrated hydrochloric acid to form a reaction mixture which was agitated at room temperature for about 6 hours to effect partial cohydrolysis-condensation reaction of the silanes. The thus obtained reaction mixture was diluted by the addition of 200 g of butyl acetate and 300 g of propyleneglycol monopropyl ether to give a liquid coating composition.

The thus prepared liquid coating composition was uniformly applied by using a spinner on to the surface of a 6-inch glass substrate plate, on which a stripe pattern of red, blue and green with a line width of 80 μm and a space width of 20 μm was formed, and the coating layer was, after drying, baked at 250° C. for 1 hour to give a fully cured protective film having a thickness of 2.0 μm. This protective film had a pencil hardness of 7 H. In the next place, an electroconductive ITO film was formed on the protective film by the sputtering method and an orientation membrane of a polyimide resin was formed further thereon to complete a display panel specimen, which was subjected to a heating test at 250° C. for 1 hour to find appearance of absolutely no creases or formation of cracks on both of the stripe pattern and the ITO film.

EXAMPLE 2

A solution prepared by dissolving 208 g (1 mole) of tetraethoxy silane, 117 g (0.5 mole) of 3-acryloxypropyl trimethoxy silane and 74 g (0.5 mole) of vinyl trimethoxy silane in 170 g of isopropyl alcohol was admixed with 190 g of deionized water and 0.02 g of concentrated nitric acid to form a reaction mixture which was agitated at room temperature for about 6 hours to effect partial cohydrolysis-condensation reaction of the silanes. The thus obtained reaction mixture was diluted by the addition of 240 g of butyl acetate and 200 g of ethyleneglycol monobutyl ether to give a liquid coating composition.

A 6-inches glass substrate plate was provided with a protective film by coating with the thus prepared liquid coating composition followed by drying and baking of the coating layer in substantially the same manner as in Example 1 except that the baking treatment of the coating layer was performed at 200° C. for 2 hours and the protective coating film thus formed had a thickness of 1.5 µm. This protective film had a pencil hardness of 6 H. The result of the heat resistance test of the completed display panel specimen undertaken under the same conditions as in Example 1 was that the specimen was fully heat-resistant to cause absolutely no creases or crack formation.

EXAMPLE 3

A solution prepared by dissolving 208 g (1 mole) of tetraethoxy silane, 68.8 g (0.2 mole) of di(3-methacryloxypropyl) dimethoxy silane and 27.8 g (0.1 mole) of 3-glycidyloxypropyl triethoxy silane in 90 g of isoamyl acetate was admixed with 88 g of deionized water and 0.01 g of phosphoric acid to form a reaction mixture which was agitated at room temperature for about 6 hours to effect partial cohydrolysis-condensation reaction of the silanes. The thus obtained reaction mixture was diluted by the addition of 100 g of isoamyl acetate and 200 g of hexyleneglycol to give a liquid coating composition.

A 6-inches glass substrate plate was provided with a protective film by coating with the thus prepared liquid coating composition followed by drying and baking of the coating layer in substantially the same manner as in Example 1 except that the baking treatment of the coating layer was performed at 160° C. for 2 hours and the protective coating film thus formed had a thickness of 1.5 µm. This protective film had a pencil hardness of 7 H. The result of the heat resistance test of the completed display panel specimen undertaken under the same conditions as in Example 1 was that the specimen was fully heat-resistant to cause absolutely no creases or crack formation.

EXAMPLE 4

A solution prepared by dissolving 46 g (0.3 mole) of tetramethoxy silane and 278 g (1 mole) of 3-glycidyloxypropyl triethoxy silane in 100 g of butyl acetate was admixed with 76 g of deionized water and 0.01 g of hydrochloric acid to form a reaction mixture which was agitated at room temperature for about 6 hours to effect partial cohydrolysis-condensation reaction of the silanes. The thus obtained reaction mixture was diluted by the addition of 200 g of dipropyleneglycol, 50 g of octyleneglycol and 73 g of butyl acetate to give a liquid coating composition.

A 6-inches glass substrate plate was provided with a protective film by coating with the thus prepared liquid coating composition followed by drying and baking of the coating layer in substantially the same manner as in Example 1 except that the baking treatment of the coating layer was performed at 160° C. for 2 hours and the protective coating film thus formed had a thickness of 1.5 µm. This protective film had a pencil hardness of 6 H. The result of the heat resistance test of the completed display panel specimen undertaken under the same conditions as in Example 1 was that the specimen was fully heat-resistant to cause absolutely no creases or crack formation.

EXAMPLE 5

Into a three-necked flask of 2 liters capacity equipped with a reflux condenser, thermometer and dropping funnel were introduced 248 g (1 mole) of 3-methacryloxypropyl trimethoxy silane and 400 g of propyleneglycol monomethyl ether to form a reaction mixture. Thereafter, a solution of 2.5 g of 2,2'-azobisisobutyronitrile in 90 g of ethyleneglycol monomethyl ether as a polymerization initiator was added dropwise into the reaction mixture in the flask with agitation at 60° C. under an atmosphere of nitrogen gas. After completion of the dropwise addition of the polymerization initiator, agitation of the reaction mixture in the flask was continued further at 80° C. for 1 hour and then at 110° C. for additional 1 hour to complete the polymerization reaction followed by cooling to room temperature. In the next place, the reaction mixture in the flask was admixed with 152 g (1 mole) of tetramethoxy silane together with 126 g of deionized water and 0.02 g of concentrated hydrochloric acid and agitated at room temperature for about 6 hours to effect partial cohydrolysis-condensation reaction of the silanes. The thus obtained reaction mixture was diluted by the addition of 200 g of butyl acetate and 136 g of isopropyl alcohol to give a liquid coating composition.

A 6-inches glass substrate plate was provided with a protective film by coating with the thus prepared liquid coating composition followed by drying and baking of the coating layer in substantially the same manner as in Example 1 except that the baking treatment of the coating layer was performed at 200° C. for 2 hours and the protective coating film thus formed had a thickness of 1.5 µm. This protective film had a pencil hardness of 6 H. The result of the heat resistance test of the completed display panel specimen undertaken under the same conditions as in Example 1 was that the specimen was fully heat-resistant to cause absolutely no creases or crack formation.

EXAMPLE 6

The experimental procedure was substantially the same as in Example 5 described above except that, instead of the preliminary homopolymerization of 3-methacryloxypropyl trimethoxy silane, copolymerization was performed in a polymerization mixture prepared by dissolving 248 g (1 mole) of 3-methacryloxypropyl trimethoxy silane and 6 g (0.02 mole) of pentaerithritol trimethacrylate in 400 g of propyleneglycol monomethyl ether.

A 6-inches glass substrate plate was provided with a protective film by coating with the thus prepared liquid coating composition followed by drying and baking of the coating layer in substantially the same manner as in Example 1 except that the baking treatment of the coating layer was performed at 200° C. for 2 hours and the protective coating film thus formed had a thickness of 1.5 µm. This protective film had a pencil hardness of 6 H. The result of the heat resistance test of the completed display panel specimen undertaken under the same conditions as in Example 1 was that the specimen was fully heat-resistant to cause absolutely no creases or crack formation.

EXAMPLE 7

The experimental procedure was substantially the same as in Example 1 except that the liquid coating composition was further admixed with 6 g (0.06 mole) of dipentaerithritol hexaacrylate, the protective coating film had a thickness of 1.5 μm and the baking treatment of the coating layer was performed at 200° C. for 2 hours. The protective film had a pencil hardness of 6 H. The result of the heat resistance test of the completed display panel specimen undertaken under the same conditions as in Example 1 was that the specimen was fully heat-resistant to cause absolutely no creases or crack formation.

EXAMPLE 8

The experimental procedure was substantially the same as in Example 1 except that the liquid coating composition was further admixed with 60 g (0.06 mole) of hexa(2-acryloxyethyl) phosphazene, the protective coating film had a thickness of 1.5 μm and the baking treatment of the coating layer was performed at 200° C. for 2 hours. The protective film had a pencil hardness of 6 H. The result of the heat resistance test of the completed display panel specimen undertaken under the same conditions as in Example 1 was that the specimen was fully heat-resistant to cause absolutely no creases or crack formation.

COMPARATIVE EXAMPLE 1

The experimental procedure was about the same as in Example 1 except that the liquid coating composition here used was a solution prepared by dissolving 5 g of a soluble polyimide resin in 95 g of N-methyl-2-pyrrolidone and the baking treatment of the coating layer was performed at 200° C. for 2 hours to give a protective film having a thickness of 1.5 μm of which the pencil hardness was 2 H. The result of the heat-resistance test of the completed display panel specimen was that creases were found in both of the stripe pattern and the ITO membrane.

COMPARATIVE EXAMPLE 2

The experimental procedure was about the same as in Example 1 except that the liquid coating composition here used was prepared by dissolving 30 g of a clear epoxy resin (Epikote 1004, a product by Yuka Shell Co.) in 70 g of ethyleneglycol monobutyl ether and the baking treatment of the coating layer was performed at 200° C. for 2 hours to give a protective film having a thickness of 1.5 μm of which the pencil hardness was 2 H. The result of the heat-resistance test of the completed display panel specimen was that creases were found in both of the stripe pattern and the ITO membrane.

EXAMPLE 9

A solution prepared by dissolving 152 g (1 mole) of tetramethoxy silane and 248 g (1 mole) of 3-methacryloxypropyl trimethoxy silane in 175 g of n-butyl alcohol was admixed with 126 g of deionized water and 0.02 g of concentrated hydrochloric acid and agitated at room temperature for about 6 hours to effect partial cohydrolysis-condensation reaction of the silanes. Thereafter, a 70 g portion of the thus obtained reaction mixture was admixed with a colloidal silica having a particle diameter of 10 to 20 nm (Snowtex, a product by Nissan Chemical Co.) in an amount of 228 g as solid, 10 g of n-butyl acetate and 395 g of propyleneglycol monopropyl ether to give a liquid coating composition.

A 6-inches substrate plate of glass provided with an electrode pattern of ITO film having a line width of 80 μm was uniformly coated by using a spinner with the above prepared liquid coating composition to form a coating layer which was dried and subjected to a baking treatment at 250° C. for 1 hour to give a cured protective film having a thickness of 100 nm and a pencil hardness of 9 H. The protective film was very uniform over the whole area absolutely without cracks.

EXAMPLE 10

A solution prepared by dissolving 208 g (1 mole) of tetraethoxy silane, 117 g (0.5 mole) of 3-acryloxypropyl trimethoxy silane and 74 g (0.5 mole) of vinyl trimethoxy silane in 170 g of isopropyl alcohol was admixed with 190 g of deionized water and 0.02 g of concentrated nitric acid and agitated at room temperature for about 6 hours to effect partial cohydrolysis-condensation reaction of the silanes. Thereafter, the thus obtained reaction mixture was admixed with 6.35 g of a finely divided silica powder having an average particle diameter of 100 nm (Hipresica FQ, a product by Ube-Nitto Chemical Co.), 100 g of isopropyl acetate and 403.5 g of ethyleneglycol monomethyl ether to give a liquid coating composition.

A cured protective film having a thickness of 100 nm was formed using the thus prepared liquid coating composition on a glass substrate plate in the same manner as in Example 9 except that the baking treatment was performed at a temperature of 200° C. for 2 hours. The protective film was very uniform over the whole area and had a pencil hardness of 8 H.

EXAMPLE 11

A solution prepared by dissolving 208 g (1 mole) of tetraethoxy silane, 27.8 g (0.1 mole) of 3-glycidyloxypropyl triethoxy silane and 68.8 g (0.2 mole) of di(3-methacryloxypropyl) dimethoxy silane in 90 g of ethyleneglycol monoethyl ether was admixed with a colloidal silica having a particle diameter of 10 to 20 nm (Adelite AT, a product by Asahi Denka Kogyo Co.) in an amount of 60 g as solid and a colloidal alumina having a particle diameter of 10 to 20 nm (Snowtex AS, a product by Nissan Chemical Co.) in an amount of 18 g as solid in combination followed by the addition of 88 g of deionized water and 0.01 g of phosphoric acid and agitated at room temperature for about 6 hours to effect partial cohydrolysis-condensation reaction of the silanes. Thereafter, the thus obtained reaction mixture was diluted by the addition of 100 g of dipropyleneglycol monomethyl ether, 100 g of isoamyl acetate and 200 g of hexyleneglycol to give a liquid coating composition.

A cured protective film having a thickness of 180 nm was formed using the thus prepared liquid coating composition on a glass substrate plate in the same manner as in Example 9 except that the baking treatment was performed at a temperature of 160° C. for 2 hours. The protective film was very uniform over the whole area and had a pencil hardness of 9 H.

EXAMPLE 12

A solution prepared by dissolving 46 g (0.3 mole) of tetramethoxy silane and 278 g (1 mole) of 3-glycidyloxypropyl triethoxy silane in 100 g of butyl acetate was admixed with 76 g of deionized water and 0.01 g of concentrated hydrochloric acid and agitated at room temperature for about 6 hours to effect partial cohydrolysis-condensation reaction of the silanes. Thereafter, the thus obtained reaction mixture was admixed with a finely divided titanium dioxide powder having an average particle diameter of 17 nm (Idemitsu Titania, a product by Idemitsu Kosan Co.) in an amount of 33 g as solid and diluted by the addition of 300 g of isopropyl alcohol, 200 g of dipropyleneglycol, 50 g of octyleneglycol and 73 g of isobutyl acetate to give a liquid coating composition.

A cured protective film having a thickness of 200 nm was formed using the thus prepared liquid coating composition on a glass substrate plate in the same manner as in Example 9 except that the baking treatment was performed at a temperature of 160° C. for 2 hours. The protective film was very uniform over the whole area and had a pencil hardness of 9 H. EXAMPLE 13

Into a three-necked flask of 2 liters capacity equipped with a reflux condenser, thermometer and dropping funnel were introduced 248 g (1 mole) of 3-methacryloxypropyl trimethoxy silane and 400 g of propyleneglycol monomethyl ether to form a reaction mixture, into which a solution of 2.5 g of 2,2'-azobisisobutyronitrile in 90 g of ethyleneglycol monoethyl ether was added dropwise at 60° C. with agitation under an atmosphere of nitrogen and agitation was continued thereafter for 1 hour at 80° C. and then for 1 hour at 110° C. to effect polymerization of the silane compound followed by cooling to room temperature. Thereafter, the thus obtained reaction mixture was admixed with 152 g (1 mole) of tetramethoxy silane together with 126 g of deionized water and 0.02 g of concentrated hydrochloric acid and agitated at room temperature for about 6 hours to effect partial cohydrolysis-condensation reaction of the silane compounds. Thereafter, a 100 g portion of the thus obtained reaction mixture was admixed with a colloidal silica having a particle diameter of 10 to 20 nm (Snowtex, a product by Nissan Chemical Co.) in an amount 228 g as solid, 20 g of n-butyl acetate, 13 g of isopropyl alcohol and 340 g of propyleneglycol monopropyl ether to give a liquid coating composition.

A cured protective film having a thickness of 120 nm was formed using the thus prepared liquid coating composition on a glass substrate plate in the same manner as in Example 9 except that the baking treatment was performed at a temperature of 200° C. for 2 hours. The protective film was very uniform over the whole area and had a pencil hardness of 9 H.

EXAMPLE 14

The experimental procedure was substantially the same as in Example 13 except that the polymerization of 1 mole of 3-methacryloxypropyl trimethoxy silane in 400 g of propyleneglycol monomethyl ether was performed with further addition of 6 g (0.02 mole) of pentaerithritol trimethacrylate as a comonomer to the reaction mixture.

A cured protective film having a thickness of 150 nm was formed using the liquid coating composition prepared with the above described modification of the procedure on a glass substrate plate in the same manner as in Example 9 except that the baking treatment was performed at a temperature of 200° C. for 2 hours. The protective film was very uniform over the whole area and had a pencil hardness of 9 H.

EXAMPLE 15

The experimental procedure was substantially the same as in Example 9 except that the liquid coating composition prepared in the same manner was further admixed with 6 g (0.01 mole) of dipentaerithritol hexaacrylate.

A cured protective film having a thickness of 180 nm was formed using the liquid coating composition prepared with the above described modification on a glass substrate plate in the same manner as in Example 9 except that the baking treatment was performed at a temperature of 200° C. for 2 hours. The protective film was very uniform over the whole area and had a pencil hardness of 9 H.

EXAMPLE 16

The experimental procedure was substantially the same as in Example 9 except that the liquid coating composition prepared in the same manner was further admixed with 60 g (0.06 mole) of hexa(2-acryloxyethyl) phosphazene.

A cured protective film having a thickness of 150 nm was formed using the liquid coating composition prepared with the above described modification on a glass substrate plate in the same manner as in Example 9 except that the baking treatment was performed at a temperature of 200° C. for 2 hours. The protective film was very uniform over the whole area and had a pencil hardness of 9 H.

What is claimed is:

1. A method for the formation of a protective coating film on the surface of a substrate which comprises the steps of:
    (a) coating the surface with a liquid coating composition containing a partial cohydrolysis-condensation product of a silane mixture consisting essentially of first silane compound represented by the formula:

$$Si(OR)_4,$$

in which R is an alkyl group having 1 to 4 carbon atoms or a phenyl group, and a second silane compound represented by the formula:

$$R^1{}_n Si(OR)_{4-n},$$

in which R has the same meaning as defined above, $R^1$ is a functional group which is a polymerizable group selected from the group consisting of vinyl, 3-acryloxypropyl and 3-methacryloxypropyl and 3-glycidyloxypropyl and n is 1, 2 or 3, to form a coating layer,
        and wherein the amount of the second silane compound is in the range from 0.05 to 9 moles per mole of the first silane compound; and
    (b) drying and heating the coating layer at a temperature in the range from 140° to 300° C. for 15 to 120 minutes.

2. The method for the formation of the protective coating film on the surface of the substrate as claimed in claim 1 in which the liquid coating composition further contains a polyfunctional acrylic monomer in an amount in the range from 0.5 to 300 parts by weight per 100 parts by weight of the second silane compound.

3. The method for the formation of the protective coating film on the surface of the substrate as claimed in claim 1 in which the liquid coating composition further contains a finely divided inorganic filler having an average particle diameter in the range of 5 to 200 nm.

4. A method for the formation of a protective coating film on the surface of a substrate which comprises the steps of:
    (a) coating the surface with a liquid coating composition containing a partially cohydrolysis-condensation product of a silane mixture consisting essentially of first silane compound represented by the formula:

$$Si(OR)_4,$$

in which R is an alkyl group having 1 to 4 carbon atoms or a phenyl group, and an intermolecular reaction product of a second silane compound represented by the formula:

$$R^1{}_n Si(OR)_{4-n},$$

in which R has the same meaning as defined above, $R^1$ is a functional group which is a polymerizable group selected from the group consisting of vinyl, 3-acryloxypropyl and 3-methacryloxypropyl and 3-glycidyloxypropyl and n is 1, 2 or 3, to form a coating layer, and wherein the amount of the second silane compound is in the range from 0.05 to 9 moles per mole of the first silane compound; and (b) drying and heating the coating layer at a temperature in the range from 140° to 300° C. for 15 to 120 minutes.

5. The method for the formation of the protective coating film on the surface of the substrate as claimed in claim 4 in which the functional group in the second silane compound is a polymerizable group and the intermolecular reaction product of the second silane compound is a polymerization product thereof.

6. The method for the formation of the protective coating film on the surface of the substrate as claimed in claim 4 in which the liquid coating composition further contains a polyfunctional acrylic monomer in an amount in the range from 0.5 to 300 parts by weight per 100 parts by weight of the second silane compound.

7. The method for the formation of the protective coating film on the surface of the substrate as claimed in claim 4 in which the liquid coating composition further contains a finely divided inorganic filler having an average particle diameter of 5 to 200 nm.

* * * * *